United States Patent [19]

Vetter

[11] 4,442,960
[45] Apr. 17, 1984

[54] SADDLEBAGS

[75] Inventor: Bruce W. Vetter, Homer, Ill.

[73] Assignee: BagMan, Inc., Homer, Ill.

[21] Appl. No.: 313,637

[22] Filed: Oct. 22, 1981

[51] Int. Cl.³ ............................................. B62J 9/00
[52] U.S. Cl. ................................. 224/32 A; 190/108;
383/13; 383/14
[58] Field of Search .................. 224/32 A, 32 R, 901;
190/52, 60

[56] References Cited

U.S. PATENT DOCUMENTS

| | | | |
|---|---|---|---|
| 2,577,670 | 12/1951 | Adams | 190/52 X |
| 2,813,602 | 11/1957 | MacArthur, Jr. | 190/60 |
| 3,059,207 | 11/1977 | Jackson et al. | 224/31 |
| 3,622,056 | 11/1971 | Droeger | 224/9 |
| 3,786,972 | 1/1974 | Alley | 224/31 |
| 3,937,374 | 2/1976 | Hine, Jr. | 224/32 A |
| 3,938,716 | 2/1976 | Jackson et al. | 224/9 |
| 3,955,727 | 5/1976 | Montgomery | 224/31 |
| 3,989,174 | 11/1976 | Norinsky | 224/32 A X |
| 4,066,195 | 1/1978 | Dickler | 224/8 R |
| 4,079,767 | 3/1978 | Howard | 224/901 X |
| 4,258,869 | 3/1981 | Hilgendorff | 224/32 A |
| 4,262,829 | 4/1981 | Hine, Jr. et al. | 224/32 R |

FOREIGN PATENT DOCUMENTS 1086064  2/1955  France ........................ 224/32 A Primary Examiner—Steven M. Pollard
Attorney, Agent, or Firm—Wood, Dalton, Phillips, Mason & Rowe

[57] ABSTRACT

A pair of saddlebags for a motorcycle or like vehicle comprising a pair of housings joined by a plurality of flexible straps which straddle the vehicle and suspend the housings on opposite sides thereof. Each housing has associated therewith a compartment formed by a protective cover within which buckles are situated to adjustably secure the ends of the strap originating from the opposing housing. Additional straps are adjustably secured to the housings within the compartments and are removably engagable at their ends with an adaptor on the vehicle frame. A mounting means on the vehicle seat mates with the straps to further secure the saddlebags. A pair of handles are included with each housing through which the housings may be carried either individually or in combination.

17 Claims, 7 Drawing Figures

U.S. Patent   Apr. 17, 1984   Sheet 1 of 2   4,442,960
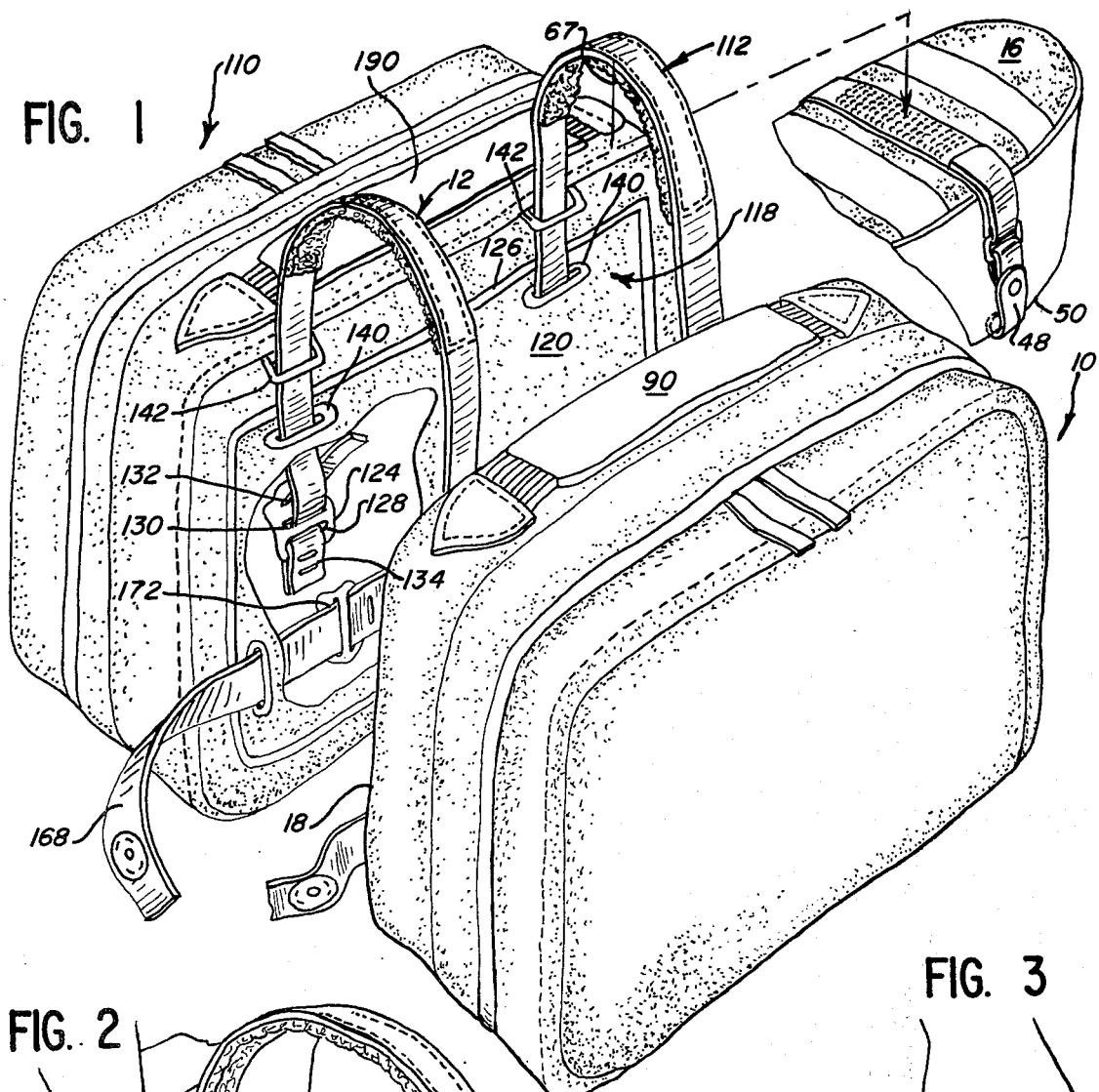
FIG. 1
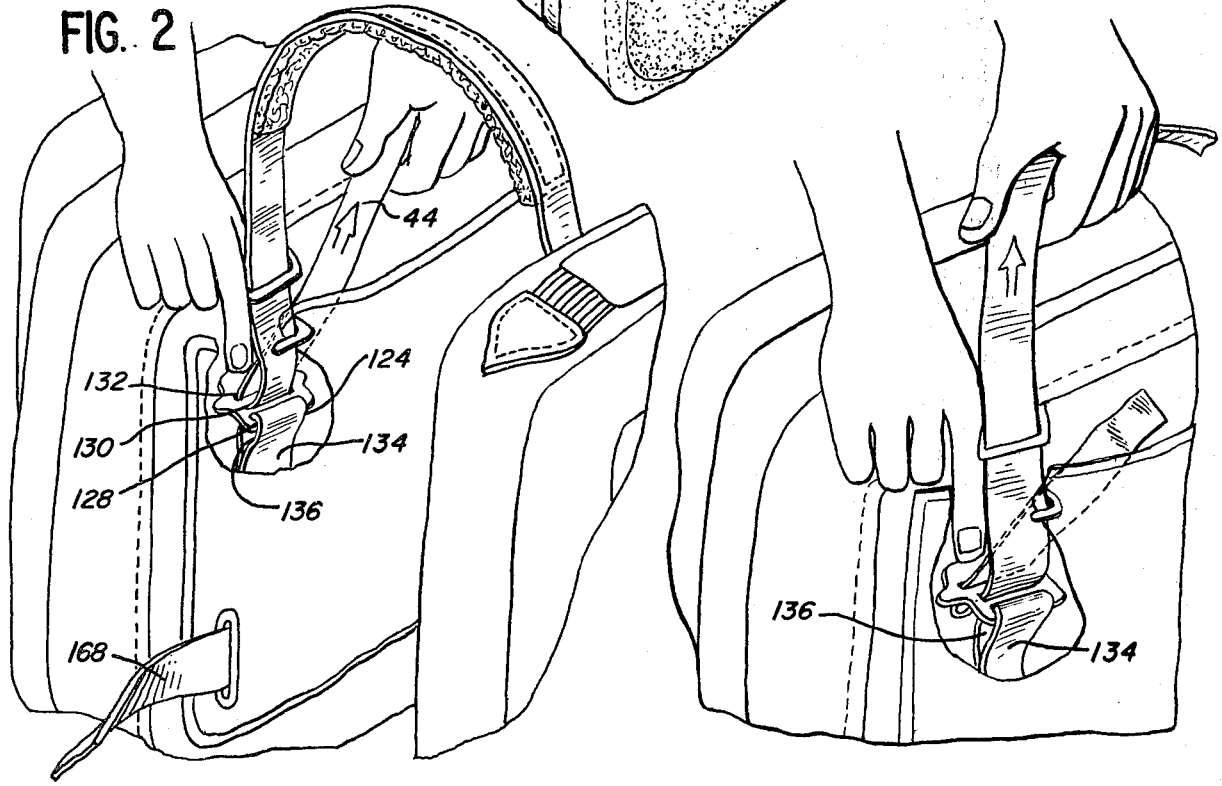
FIG. 2
FIG. 3

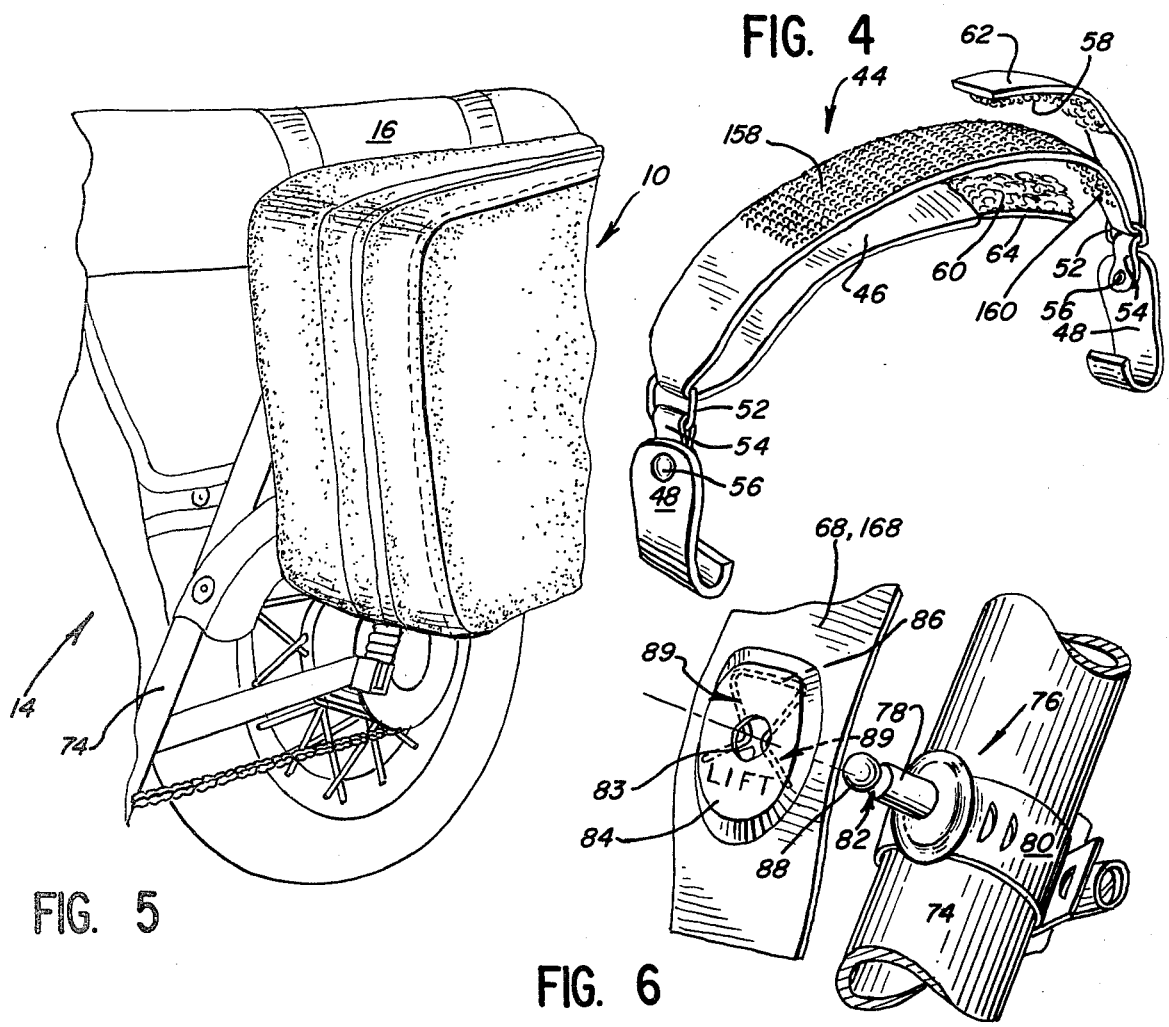
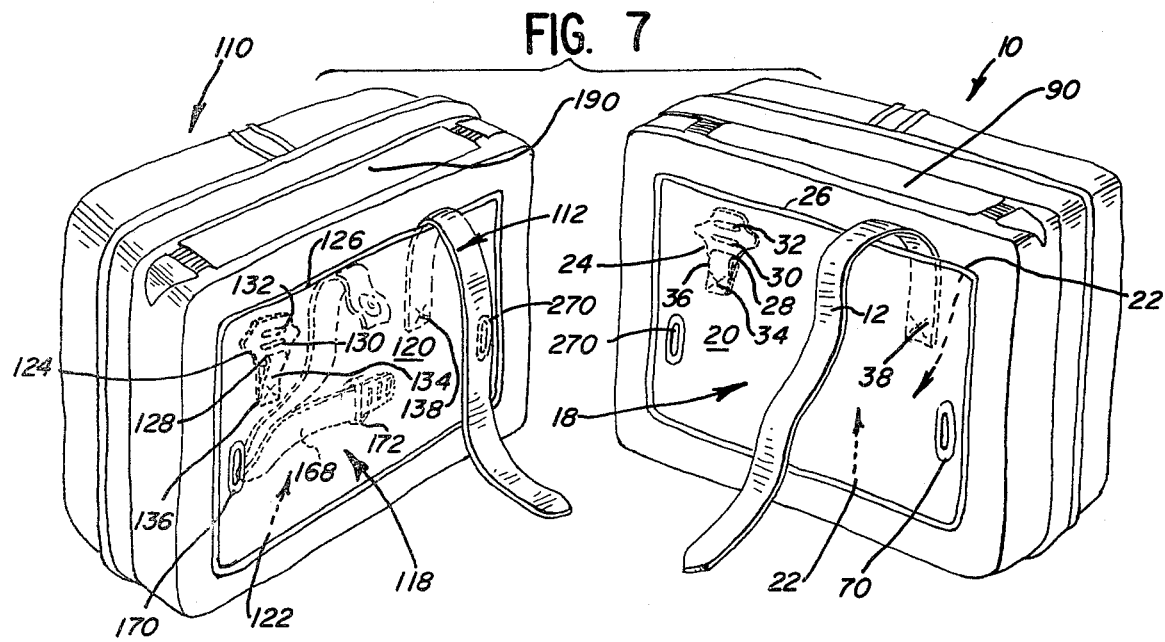

SADDLEBAGS

BACKGROUND OF THE INVENTION

Side saddlebags are frequently used in conjunction with bicycles, motorcycles and other vehicles having limited storage capabilities, to accommodate additional effects. In that the vehicles may be operated at high speeds, rigid housings or frameworks are generally used which might be positively secured to the vehicle by structures integrally mated with the vehicle frame.

Exemplary are U.S. Pat. No. 3,786,972 to Alley and U.S. Pat. No. 4,262,829 to Hine, Jr. et al. which disclose a pair of side packs on a bicycle. In each, a rigid framework is constructed intricately with a bicycle frame and defines a receptacle for a conforming container.

The drawbacks of such a construction are numerous. Most notable is the fact that a permanent or semi-permanent framework is required to accommodate the containers. Apart from the inconvenience of mounting, the framework also adds a considerable amount of unwanted weight to the vehicle. Further, with the packs removed, the framework is an obtrusive addition to the rear of the vehicle.

As an alternative to the rigid design, a soft saddlebag construction is disclosed in U.S. Pat. No. 4,258,869 to Hilgendorff. In Hilgendorff, an expansive web extends between the side bags to afford stability to the mounted pack. To secure the pack to the vehicle, a plurality of tie strings are included about the housing. Each time the pack is mounted, the ties must be individually secured to and adjusted about the vehicle. This is both inconvenient and time consuming. Further, when the pack is removed, it must be transported as a unit, including both the housings and the adjoining web. Thus it has little utility separate from the vehicle.

The present invention is directed to overcoming one or more of the problems specified above.

SUMMARY OF THE INVENTION

The saddlebags of the present invention comprise a first and second housing and at least one flexible strap associated with each of the housings. A mounting means associated with a vehicle to which the saddlebags attach, is matable with the flexible straps, from which the housings can be suspended.

It is the principal object of the present invention to provide a pair of saddlebags which are adaptable to multiple vehicle constructions as, for example, various makes of motorcycles or snowmobiles. To accomplish this, the flexible straps which extend between and join the housings, incorporate an adjusting capability and can accommodate vehicles of various widths. By adjusting the spacing between the housings, the riding height of the housings, which are suspended at the sides of the vehicle, can be adjusted as desired.

It is another object of the present invention to provide a pair of saddlebags which are not only easily adaptable, but which can, once mounted, be readily taken off or replaced on the vehicle without further adjustment. Buckle plates, situated on at least one of the housing, facilitate adjustment of the length of the straps from the opposing housing. With the length properly adjusted, the housings are positioned over the vehicle, with the straps straddling the seat and suspending the housings at the sides of the vehicle. A secondary mounting means is included with at least one of the housings, and preferably comprises a flexible strap which is snappingly engagable with an adaptor on the bike frame. The secondary strap can likewise be made adjustable. To remove the saddlebags, the secondary straps are unsnapped and the saddlebags separated from the vehicle. Because the adjustments on the straps are maintained, the saddlebags can be readily remounted.

It is another object of the invention to provide an area with the housings within which the straps can be stored. To accomplish this, a protective member overlies a portion of the housings, and in conjunction therewith defines a compartment within which the straps can be folded and stored. The member also shields the strap adjusting means, which are situated within the compartment.

It is a further object of the invention to provide a secure connection between the saddlebags and the vehicle. To accomplish this, the mounting means associated with the vehicle may include Velcro adhesive which intersects mating Velcro on the underside of the straps. This connection, in conjunction with the secondary straps connecting the bike frame, assures positive mounting upon the vehicle.

It is a still further object of the present invention to make the housings usable apart from the vehicle. A handle is included on either or both of the housings through which the housings may be transported. With the housings separated, the straps can be extended and folded within the compartment so as to be out of view.

BRIEF DESCRIPTION OF THE DRAWINGS

FIG. 1 is a perspective view of a preferred form of the saddlebags embodying the present invention.

FIG. 2 illustrates the method of shortening a flexible mounting strap associated with the saddlebags.

FIG. 3 illustrates the method of lengthening the strap of FIG. 2.

FIG. 4 is an enlarged perspective view of a mounting means securable to a motorcycle seat.

FIG. 5 is a sectional perspective view of the saddlebags positioned on a motorcycle.

FIG. 6 is an enlarged sectional perspective view of an adaptor on a vehicle frame for receiving the end of a secondary mounting strap.

FIG. 7 is a perspective view of the saddlebag housings separated and in spaced relationship to each other.

DETAILED DESCRIPTION OF THE DRAWINGS

Referring initially to FIGS. 1 and 7, the saddlebags of the present invention are illustrated and comprise a first housing 10 and a second housing 110 spaced therefrom and joined by laterally extending forward and rear flexible sling straps 12, 112, respectively. The saddlebags, as shown in FIG. 5, are positioned upon a motorcycle 14, with the straps 12, 112 straddling the seat 16 and suspending the housings at either side of the vehicle 14. The weight of the housings urges the straps downwardly and generally into conformity with the contour of the seat 16.

The housings 10, 110 are constructed preferably from a light, flexible material such as nylon, which is substantially impervious to water. Stiffening material may be incorporated into the housing 10, 110 to maintain their shape particularly when they are empty. While the precise construction and configuration of the housings 10, 110 does not form a part of the present invention, it is desirable that the inwardly facing housing surfaces 18, 118 be substantially flat so as to abut closely against the sides of the vehicle 14 upon which they are mounted, and against each other when the housings are separated from the vehicle for carrying.

A sheet 20, 120 overlies and is sewn to the facing housing surfaces 18, 118, and together therewith defines a protective compartment 22, 122 within which the mounting straps 12, 112 and adjusting means 24, 124 therefor can be hidden from view. The sheet 20, 120 is secured to the housing along all but its upper edge 26, 126 which permits access to the adjusting means as illustrated in FIGS. 2 and 3 and discussed in the following paragraphs.

On the surface 18, 118 of each housing 10, 110, and within the compartment 22, 122, associated therewith, are included both a sling strap 12, 112 and an adjusting means 24, 124 comprising a flat buckle plate 24, 124 which receives the strap 12, 112 from the opposing housing. The plates 24, 124 include three vertically spaced and aligned, longitudinally extending slots 28, 30, 32, 128, 130, 132 which are dimensioned approximately to the size of the slings 12, 112. To attach the plates 24, 124 to the housings, a strip of material 34, 134 is extended through the lowest slot 28, 128 and doubled over itself as to form a loop 36, 136 which surrounds the lower portion of the plate. The overlapped material 34, 134 is stitched to the housings such that the loop can flex away from the housings, as in FIGS. 2 and 3, and the plate can slide about the loop, which facilitates adjustment of the sling straps 12, 112. One end of each sling strap 12, 112 is sewn directly to one of the housings 10, 110 adjacent their ends 38, 138.

The straps 12, 112, as shown in FIG. 1, are introduced to the opposing compartments 22, 122 through a reinforced aperture 140 in the sheet 20, 120. Alternately, as shown in FIG. 7, the straps 12, 112 might be extended through the open upper edge 26, 126 of the compartment 22, 122. In either embodiment, a guide ring (FIG. 1) 142 may be included to maintain the straps 12, 112 closely against the facing surfaces 18, 118 at the upper portion of the housings 10, 110. A similar arrangement is used to direct the strap outwardly from the compartment, as illustrated in FIG. 1 for the rear strap 112.

To adjustably secure the free end portions of straps 12, 112 to the housings 10, 110, the ends of the straps 12, 112 are extended inwardly or outwardly through the middle slot 30, 130 and oppositely through the upper slot 32, 132, in the plate 24, 124, whereby the strap 12, 112 will be held frictionally relative thereto. To vary the length of the sling 12, 112, the plate is manually reoriented, as with a finger, towards a horizontal position, as in FIGS. 2 and 3, to reduce the friction between the plate and strap. Thereafter the strap end 44 may be drawn upwardly in the direction of the arrow in FIG. 2 to shorten the sling, or alternately an intermediate position on the sling may be grasped and drawn in the direction of the arrow in FIG. 3 to lengthen the sling. This adjusting capability is important to accommodate different vehicle constructions as well as to achieve the desired vertical position of the housings on the sides of the vehicle as may be required for example to avoid contact with the exhaust pipes. With the adjustments made, the loose ends of the straps can be folded and stored out of view within the compartments.

To secure the saddlebags to the vehicle 14, a mounting member 44 (FIG. 4) is initially secured to the seat 16. The mounting member includes a flexible adjustable strap 46 which spans the width of the seat. A pair of hooks 48 are engageable at the lower lip 50 of the seat 16 as shown in FIG. 1. At the upper portion of each of the hooks is attached a loop member 52 to receive the strap 46. To attach the loop 52, U-shaped member 54 surrounds the lower portion thereof and is doubled over itself and riveted at 56 to the hooks 48. The loop 52 is pivotable about the horizontally directed rivet so that the orientation of the strap 46 might be varied to accommodate different seat contours.

The strap 46 includes Velcro strips 58, 60 adjacent its ends 62, 64 and on opposite sides thereof. The strap 46 is extended through the loops 52 and doubled over itself at both ends. Velcro strips 158, 160 are included on opposite side of and intermediate the length of the strap 46 to intersect and mate with the Velcro on the doubled over ends 62, 64. With the lower strap end 64 secured at the underside 66 of the strap 46, the upper end can be drawn firmly through the loop 52 and mated with the upper Velcro strip 158 to snug the strap 46 about the seat.

The Velcro 158 on the upper edge of the strap 46 extends substantially across the width of the seat to match with a Velcro strip 67 on the underside of the rear sling strap which prevents movement of the saddlebags when mounted. A similar seat mounting member (not shown) is included forward of the rear mount 44 and coincides and mates with the forward sling strap 12 in like manner.

Toward the lower region of the housings are included a pair of secondary mounting straps 68, 168 directed forwardly of and in substantially perpendicular relationship to the sling straps 12, 112. The straps extend through a reinforced vertically disposed aperture 70, 170 in the sheet 20, 120 and into the compartment 22, 122 where the ends are adjustably secured by appropriate means 172 comparable to those securing the ends of the sling straps 12, 122.

The opposing ends of the straps are mated with the vehicle frame 74 through means of an adaptor 76 shown in FIG. 6. The adaptor 76 includes a male portion comprising an elongate peg 78, integrally constructed with an adjustable hose clamp-type fitting 80, which surround and is secured to the frame tube. An annular recess 82 is included adjacent the outer edge of the peg. The peg is inserted through a correspondingly configured aperture 83 on a female fitting 84, included adjacent the ends of the straps 68, 168. Captured within the female fitting is a resilient spring clip 86 having inwardly bent legs which intersect the region of the aperture. A rounded head portion 88 of the peg separates the legs 89 of the spring clip 86 and guides the legs into the recess 82 in peg 78 to secure the connection. To remove the strap, a force is exerted on the strap end to flex the legs outwardly sufficiently to clear the head portion 88 of the peg.

In the embodiment illustrated in FIGS. 1–3, the opposing housings 10, 110 are constructed identically with the exception of the location of the mounting straps 68, 168. Alternately the securing means 172 might be centrally located within the compartment as in the housing 110 shown in FIG. 7 whereby the strap 68, 168 might be extended out either the aperture 170 as originally discussed, or out an additional aperture 270 at the opposing end of the housing to mate with the vehicle frame. This adds additional versatility in that the bags may be constructed identically and may be used interchangeably, each with the other.

A pair of strap carrying handles 90, 190 are fixed to the top of each of the housings 10, 110 through which the housings may be transported individually once removed from the vehicle and separated. When the bags are separated, strap 12 is tucked behind cover sheet 20 on bag 10 and strap 112 is tucked behind cover sheet 120 on bag 110. The straps 68, 168 are respectively, tucked behind cover sheets 20, 120 on the bags 10,110. The straps 12, 112 may be used as a carrying handle when the bags or housings 10, 110 are connected together with the straps 12, 112 and the bags are removed from the vehicle.

I claim:

1. A pair of saddlebags for a motorcycle or like vehicle comprising:
   first and second separable housings;
   a flexible strap associated with each of said housings for suspending the housings from the vehicle; and
   a first mounting means spanning the width of and being removably secured to a seat on said vehicle for mating with at least one flexible strap extending between said housings for positively locating the housings on the vehicle;
   said strap and mounting means having securing means comprising a Velcro type strip on the first mounting means removably engaging with mating means on said strap, said securing means being readily engageable and separable for detachably suspending said housings from said vehicle.

2. The saddlebags of claim 1 wherein said first mounting means has hooks on the ends thereof engaging with said seat for securing said first mounting means on said seat.

3. The saddlebags of claim 1 wherein at least one of said housings has a protective compartment along said facing wall within which compartment at least one of the flexible straps from the other housing can be extended and adjusted for length.

4. The saddlebags of claim 3 including secondary mounting means for mating at least one of said housings with the frame of said vehicle, said secondary mounting means comprising a strap having one end secured to the facing wall within said protective compartment and being attachable and detachable from the frame, said first and second mounting means positively positioning the first and second housings upon the vehicle.

5. The saddlebags of claim 1 wherein said flexible straps have Velcro-type strips thereon engaging with mating strips on said first mounting means for mounting said first and second housings on the vehicle.

6. The saddlebags of claim 1 including a handle for each of said housings to facilitate carrying said housings either separately or in combination.

7. A pair of saddlebags for a motorcycle or like vehicle comprising:
   first and second identical housings, each housing having a first end, a second end and at least one facing wall between the first and second ends facing a comparable wall on the other housing;
   each housing having a flexible member connected at one end to the facing wall near the first end of the housing and extending to an adjustable connection at the facing wall of the other housing near the second end of said other housing, said member extending between and connecting said housings;
   mounting means for securing the housings to the vehicle, said mounting means being removably attached to a seat of the vehicle and having Velcro- type means thereon engaging with mating means on the flexible member for removably suspending the housings therefrom;
   at least one protective compartment along the facing wall of one housing facing the other one of said housings, said compartment enclosing one end of the flexible member; and
   means for adjusting the extension of said flexible member, said adjusting means being within said compartment and being manipulable for increasing or decreasing the length of the flexible member so that the saddlebags can be attached to vehicles of different widths and at a desired riding height.

8. The saddlebags of claim 7 including secondary mounting means fastened to said wall in the compartment, and means within said protective compartment for adjusting the length of said secondary mounting means, said secondary mounting means having a portion extending from said compartment with an attachment member thereon matable with a mating attachment member on the vehicle, said secondary mounting means and the flexible member positively locating the first and second housings upon the vehicle.

9. The saddlebags of claim 8 wherein said secondary mounting means comprise a strap with the attachment member being a restricted aperture and the mating attachment member being a post mounted on a frame member of the vehicle.

10. A pair of saddlebags for a motorcycle or like vehicle comprising:
    first and second identical housings;
    means for connecting said first and second housings, each to the other;
    each housing having a first end, a second end and at least one facing wall between the first and second ends facing a comparable wall on the other housing;
    a compartment associated with said facing wall on each said housing;
    each said connecting means comprising an extendable strap connected at one end to the facing wall of one housing inside the compartment and close to the first end of the housing, each said connecting means extending into the compartment on the other housing and being adjustably attached to the facing wall of said other housing, said connecting means engaging first mounting means on the vehicle; and
    a secondary mounting means on each housing fastened to the facing wall in the compartment substantially at the midportion of the housing, said secondary mounting means having a fastener at a free end portion thereof connecting with a mating fastener on a frame member on said vehicle.

11. The saddlebags of claim 10 wherein said first mounting means spans the width of the vehicle and is removably secured to the vehicle, at least one extendable flexible strap has Velcro-type means coacting with mating means on the first mounting means securing said housings on the vehicle, said extendable strap adjusting to accommodate different vehicle widths and to situate the housings at a desirable riding height.

12. A pair of saddlebags for a motorcycle or like vehicle comprising:
    first and second housings;
    at least one flexible strap associated with one of said housings for connecting said first and second housings, each to the other;

at least one protective compartment associated with one of said housings within which said strap is extensible;

means within said compartment for securing an end of said flexible strap;

a first mounting means spanning with width of and secured relative to said vehicle and engageable with said strap, said strap and mounting means having securing means comprising readily engageable and separable Velcro-type strips for detachably suspending the housings from the vehicle; and secondary mounting means for removably mating at least one of said housings with a frame member on said vehicle;

said secondary mounting means, in conjunction with the first mounting means positively locating the first and second housings upon the vehicle.

13. The saddlebags of claim 12 wherein said compartment is defined by a sheet overlying and secured to said housing.

14. The saddlebags of claim 12 wherein said securing means within said compartment comprises a buckle which can be used to vary the length of the strap and thereby the spacing between said housings.

15. The saddlebags of claim 12 wherein said housings are of a flexible construction.

16. The saddlebags of claim 12 wherein said secondary mounting means comprises a flexible strap whose length is adjustable to adapt to alternative vehicle constructions.

17. The saddlebags of claim 16 including an adaptor securable to said vehicle frame for removably attaching an end of said mating means.

* * * * *